UNITED STATES PATENT OFFICE.

EBEN N. HORSFORD, OF CAMBRIDGE, MASSACHUSETTS.

PULVERULENT PREPARATION OF PHOSPHORIC ACID.

SPECIFICATION forming part of Letters Patent No. 230,874, dated August 10, 1880.

Application filed June 2, 1880. (Specimens.)

*To all whom it may concern:*

Be it known that I, EBEN NORTON HORSFORD, of Cambridge, Massachusetts, have invented certain new and useful Improvements in the Manufacture of Pulverulent Preparations of Phosphoric Acid, for use in the manufacture of baking-powders and for other purposes; and I do hereby declare that the following is a full, clear, and exact description of the invention, which will enable others skilled in the art to which it appertains to make and use the same.

Heretofore it has been deemed essential that pulverulent preparations of phosphoric acid for use in the manufacture of baking-powders should be as nearly as possible compounds of phosphoric acid with lime, in the ratio of one equivalent of lime to one equivalent of phosphoric acid; but in my application for a patent, filed May 14, 1880, the specification describes a pulverulent preparation of phosphoric acid in which there is no lime or other base, but in which the pulverulent condition owes its production and maintenance to the use, in admixture or combination, of a neutral body, like starch.

In the practical working of the process described in my specification of May 14, 1880, I have found that the presence of the small amount of lime in the form of monocalcic phosphate in the acid liquor produced as described below does not impair the action of the free phosphoric acid with which it is associated, or interfere disadvantageously with its drying when both are mixed with starch, nor does the lime interfere with the action of the phosphoric acid, except slightly in degree, when the dried product is used in the manufacture of baking-powders. The separation of the lime, by converting it into gypsum, filtration, washing, and concentration, for the purpose of obtaining a phosphoric acid wholly free from base, requires a care and skill and time and cost which increase the cost as compared with the process which is described in this specification.

The object of my invention is to produce a pulverulent preparation of phosphoric acid at the least cost consistent with a composition unobjectionable from a hygienic point of view and by a process capable of being carried out with the least expensive apparatus, making an improved article at a reduced cost.

To carry my invention into effect, I take the leached liquor, standing at 15° Baumé, obtained by thoroughly digesting one thousand six hundred pounds of pulverized bone-black with one thousand one hundred pounds of oil of vitriol diluted with three times its volume of water and leaching the emulsion. This liquor is concentrated in a suitable vessel till it becomes a thin emulsion of crystals.

It is preferable to concentrate the liquor in iron vessels lined with porcelain. In this condition it is permitted to cool, when there is incorporated with it a quantity of starch inversely proportioned to the acid strength I desire the product to have; after which the mass, which should be a stiff and somewhat brittle dough-like substance, is spread out to dry in a warm atmosphere, and when dried it is pulverized.

If it is desired that the acid powder should have a strength such that twenty parts of it by weight shall neutralize nine parts by weight of bicarbonate of soda, I take for each one thousand cubic centimeters of acid liquor, standing at 15° Baumé, three hundred grams of starch. The product thus obtained is a dry, fine, white powder, capable of being mixed with alkaline carbonates and kept in bottles or cans without decomposition. It differs from the pulverulent preparation of phosphoric acid described in my specification filed May 14, 1880, in that before adding the starch I have in that process removed the small amount of lime combined with a part of the phosphoric acid in the acid phosphate liquor, as it came from the leach, by adding an equivalent of sulphuric acid and removing the gypsum produced by filtration, leaving behind free phosphoric acid, while in the process described in this specification the lime remains in the solution in the condition of monocalcic phosphate mingled with the great bulk of free phosphoric acid as it is in the original leached liquor. It differs also in this, that with the former one thousand cubic centimeters of original liquor, standing at 15° Baumé, requires three hundred and sixty grams of starch to give a powder of such strength that twenty parts of it will neutralize nine parts of bicarbonate of soda, while the product described in this specification requires for the same strength but three hundred grams.

The powder produced by the process herein described differs from the acid powder made in accordance with the specification of my original patent of April 22, 1856, in this: Starting with substantially the same liquor that is herein described, in concentrating I added from time to time, for every one thousand cubic centimeters of liquor, at 15° Baumé, seventy-two grams in all of finely-ground bones burned to whiteness, converting thereby all the phosphoric acid of the liquor and in the white bones into monocalcic phosphate. To the emulsion thus produced, after cooling, I added starch in the ratio of one hundred grams to one thousand cubic centimeters of liquid, calculated, from the liquid and white bones, as acid liquor at 15° Baumé, dried in a warm atmosphere and pulverized.

My present process also differs from that described in my Letters Patent dated March 1, 1864, in several particulars—as, for instance, instead of proceeding with the concentration of the leached bone-liquor to completion, without adding any other matter, as now, I then added, during the concentration operation, either pure carbonate of lime or caustic lime, resulting in massed crystals. For separating said crystals and maintaining them in a separated condition gelatinized water was employed, thus coating each crystal.

I claim—

1. The process, which consists in boiling down to a suitable consistency the liquor resulting from the action of sulphuric acid upon bone-ash taken directly from the leach, and thereafter adding starch and drying and pulverizing the compound, as described.

2. The preparation of free phosphoric acid and monocalcic phosphate reduced to pulverulent condition directly from the liquid, substantially such as herein described, by concentration and admixture with a neutral substance, like starch, as above set forth.

3. A baking or effervescing powder, consisting of a mixture of the pulverulent phosphated compound prepared, substantially as herein described, with a dry alkaline carbonate.

E. N. HORSFORD.

Witnesses:
  CHAS. P. SHILLABER,
  N. D. ARNOLD.